United States Patent [19]
Van Toorn

[11] 3,806,670
[45] Apr. 23, 1974

[54] CURRENT COLLECTOR

[76] Inventor: Cornelis Hendrik Van Toorn, Bennebroekerdijk 213, Haarlemmermeer, Netherlands

[22] Filed: Nov. 22, 1972

[21] Appl. No.: 308,829

[30] Foreign Application Priority Data
Nov. 26, 1971 Netherlands .................. 7116321

[52] U.S. Cl. .................. 191/12 R, 339/8 R
[51] Int. Cl. ............................. H02g 11/00
[58] Field of Search ...... 308/221; 191/12 R, 12.2 R, 191/12.2 A, 12.4; 339/5, 8, 12

[56] References Cited
UNITED STATES PATENTS
3,521,216  7/1970  Tolegian ..................... 339/12 R
3,360,762  12/1967  Mohr ........................ 339/5 R Primary Examiner—Lloyd L. King
Assistant Examiner—D. W. Keen
Attorney, Agent, or Firm—Marshall & Yeasting

[57] ABSTRACT

A device for the transmission of electric current between relatively rotating parts comprises a pair of electrically conducting members spaced from one another along an axis, said members presenting opposed surfaces perpendicular to said axis and spaced from one another therealong. One of said members is rotatable relative to the other about said axis, and said surfaces provide a ball race in which are located a plurality of balls separating said members and providing an electrical connection therebetween. Magnetic means biases said members towards one another to maintain electrical contact with said balls and transmits flux through the balls to maintain the balls in the race.

13 Claims, 3 Drawing Figures

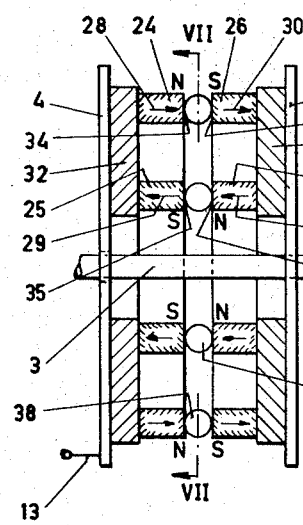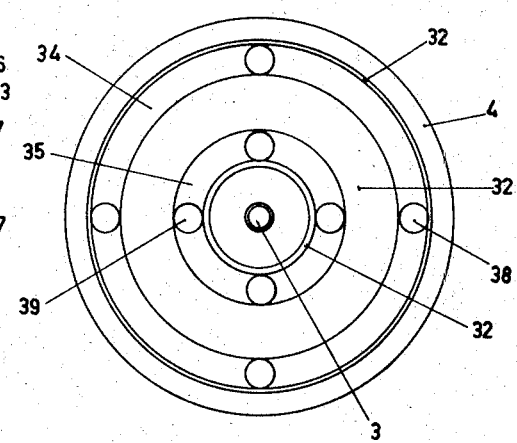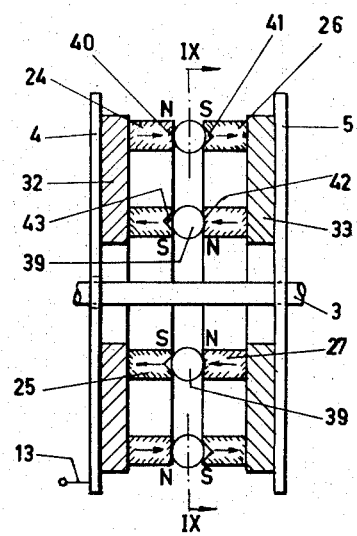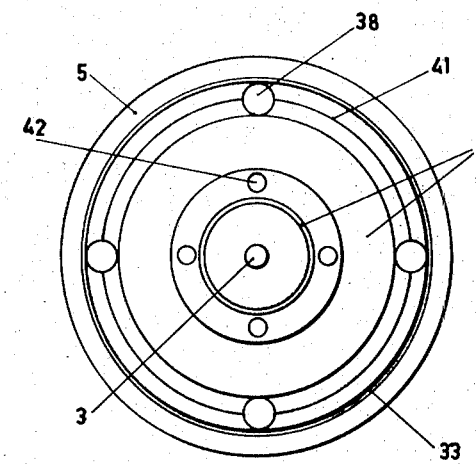

CURRENT COLLECTOR

BACKGROUND OF THE INVENTION

This invention relates to a device for the transmission of electric current between relatively rotating parts. In a preferred embodiment, the invention relates to a current collector of the type in which the current is transmitted by electrically conductive balls from a stationary part to a part rotatable about an axis of rotation, said parts having faces axially spaced with respect to said axis to serve as races for balls located between them and each being connected with or constituted by a disc-shaped electrode for supply or discharge of the current.

In a proposed device of this type, the ball races are constituted by a pair of discs, one of which is rotatably mounted on an axle of a rotatable unit, e.g. an electrically heated rotating roll whose superficial temperature has to be measured by means of a heat-sensitive element, and the other of which is stationarily connected to a housing. One side face of one of the discs is recessed, forming a race to receive a plurality of balls, and the other side face is flat. The discs face each other so that the recessed side face of the one disc co-operates with the flat side face of the other. This system can be extended to series connected current collectors by juxtaposition of similar discs. The discs are made of copper. The walls of the races are coated with a thin silver film or with a grease film containing graphite. The film can be cured on the faces. The balls are made of hardened beryllium-copper coated with a thin silver film. The discs and the balls are held in engagement by the resilience of a spring.

This resilience force should be distributed as uniformly as possible over the balls so that, in a mechanical sense, a completely balanced system is obtained and unnecessary friction heat is avoided. This heat can give rise, in certain locations in the system where dissimilar metals are in metallurgical contact, to local thermo-couple voltages whose current affects the current to be transmitted and thus the measurement of the transmitted current, giving an inexact measurement of the temperature of the roll.

In order to overcome this disadvantage, the resilient force could be distributed over a plurality of resilient contact fingers distributed in a regular pattern over the surface of the discs to be pressed together. The greater the number of fingers, that is the denser the distribution, the more the ideal situation is reached. While with a single spring only a single setting of the spring pressure is needed, with a plurality of fingers it would be necessary to set the spring pressure for each contact finger separately. This is a tedious, cumbersome, laborous and time-consuming operation. Even in a completely balanced system friction can never be completely avoided, but much would be gained if this source of errors is of constant magnitude and at the same time is a minimum irrespective of the speed of the rotatable unit.

Apart from the frictional disadvantage referred to above, there are other factors which contribute to the undesired development of heat by friction.

Firstly, the balls in the proposed device are enclosed not only axially of the axle but also radially. Friction is caused by the balls contacting the axially extending side walls of the race.

Secondly, passage of feed current for a heating element incorporated in the rotating heating roll requires that large numbers of balls be used. This is because the point contact inherent in the shape of the balls restricts the permissible current density per ball in order to avoid undesired development of heat. For example the current may be restricted to 10mA per ball. To transmit to the rotating body a feed current of 10A, 1,000 balls are therefore needed, said balls being provided in spaced concentric paths. The larger number of balls would create more friction heat.

SUMMARY OF THE INVENTION

The present invention aims to reduce or eliminate the disadvantages of the proposed device.

According to the invention, there is provided a device for the transmission of electric current between relatively rotating parts, comprising a pair of electrically conducting members spaced from one another along an axis, said members presenting opposed surfaces perpendicular to said axis and spaced from one another therealong, one of said members being rotatable relative to the other about said axis, said surfaces providing a ball race in which are located a plurality of balls separating said members and providing an electrical connection therebetween, and magnetic means biassing said members towards one another to maintain electrical contact with said balls and transmitting flux through the balls to maintain the balls in the race.

In this device, the surfaces are preferably parallel and the balls are not hindered by radial side walls nor by neighbouring balls. The friction in the current collector is thus reduced, as is the electrical resistance.

In a preferred embodiment one of the parts is stationary and the other part is rotatable about said axis. Each conducting member comprises an electrode, and the magnetic means are carried partly by each electrode so that the balls are each located between opposite magnetic poles. By virtue of the magnetic force the balls are retained in their position at low rotational speeds of the rotatable part.

The magnetic circuit can be built up of four magnets positioned, for example, along the sides of a rectangle, the magnetic orientation in assembled condition being in the axial direction with respect to the axis of rotation of the rotatable part.

In view of the acceleration forces occurring when the rotatable part rotates at higher speeds, it is desirable to design the device so that a ring of ferro-magnetic material is provided at each side of the balls with the magnetic pole facing the balls constituting the race for the balls, whilst the pole facing away from the balls is connected to the respective disc-shaped electrode.

Preferably, the device is constructed so that the side of each ring facing away from the balls is connected to a disc of ferro-magnetic material mounted on the respective disc-shaped electrode. The ring and the disc can be made of mild steel. A permanent magnet or electro-magnet located between the discs is then connected to the stationary disc and spaced from the rotatable disc by a narrow air gap.

The number of balls and thus the current density of the current to be transmitted can be increased by providing at least one pair of concentric rings of ferro-magnetic material on each electrode. Both rings of each pair can be connected by connecting straps of ferro-magnetic material to form a U-shaped magnetic circuit. In this manner concentric rows of balls are obtained and a closed circuit for the magnetic flux now passes almost entirely through ferro-magnetic material.

The connecting straps may be circumferentially spaced connecting straps, at least some of which comprise permanent magnets or electro-magnets each having its direction of magnetisation extending radially away from said axis. If some of the connecting straps form the cores of electro-magnets, a coil is wound around each of these. The provision of electro-magnets in the magnetic circuit makes it possible to vary the magnetic flux and thus the magnetic attractive force exerted on the balls. To this end, at least one coil can be connected to a DC source whose terminal voltage is adjustable to vary the flux of the electro-magnet and to vary indirectly the magnetic attractive force on the balls. This measure makes it possible to adjust the co-efficient of friction between the balls and the ball races. In this way, the device can operate with a minimum of friction and resistance and, with the rotatable part rotating at 500 rpm, the temperature of the balls appears to be the same as the surrounding atmosphere even with the races completely filled with balls.

At higher speeds, for example, at 1,000 rpm problems arise which are partly of a mechanical and partly of an electrical nature. Both originate from a substantial increase of friction. For the electric transmission system, this results in a greater noise factor owing to the greater heat development.

To overcome this drawback, at least one of the coils can be supplied with a pulsating direct current obtained from the DC-source supplying current to the electro-magnet, and one can superimpose on said pulsating current a signal-current to be transmitted by the collector. Means can be provided for varying the pulsating current in amplitude and/or frequency to influence the signal: noise ratio. The magnetic flux created by said pulsating direct current is superimposed on the flux created by the signal current which may be small with respect to the noise (for instance the signal of a thermo-couple measuring the temperature of the surface of a roll). If desired amplitude or frequency modulation can be applied to the signal. In this way the measured signal can be amplified, so decreasing the noise factor.

BRIEF DESCRIPTION OF THE DRAWINGS

FIG. 6 shows another embodiment with a closed magnetic circuit and two concentric rows of balls;

FIG. 7 is a cross-section on the line VII—VII of FIG. 6 and shows the stationary collector half;

FIG. 8 shows an alternative embodiment to FIG. 6, in which various ways for retaining the balls are indicated;

FIG. 9 is a cross-section on line IX—IX of FIG. 8 and shows the rotatable collector half;

DESCRIPTION OF THE PREFERRED EMBODIMENTS

Figure 1:
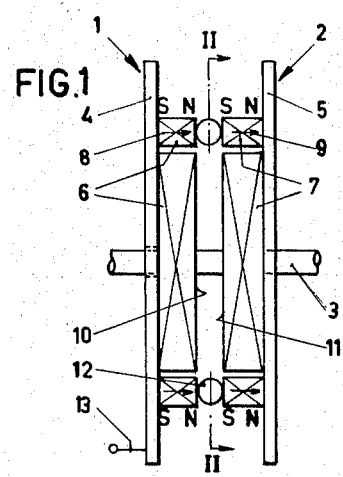
FIG. 1 is a side elevation of a magnetic ball current collector according to the invention having four magnets arranged as the sides of a square on each side of the balls.

In the Figures similar parts are indicated by like reference numerals.

Figure 2:
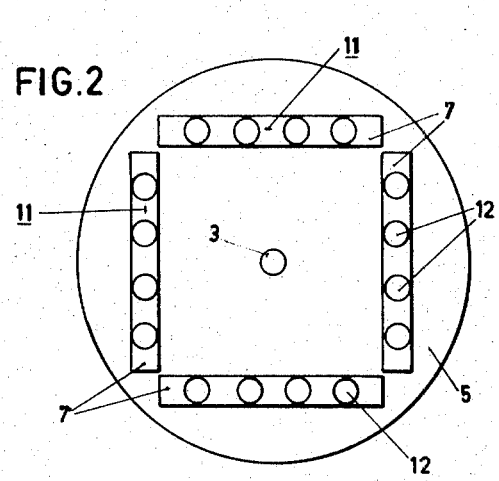
FIG. 2 is a cross-section on the line II—II of FIG. 1 and shows the rotatable collector half.

FIGS. 1 and 2 show a magnetic ball current collector according to the invention. The collector comprises a stationary collector half 1 and a rotatable collector half 2 rotatable about an axis 3 which may be the axis of a rotatable roll, not shown. The two halves are substantially symmetrical and each half comprises a disc-shaped electrode 4 or 5 of electrically conducting, non-ferrous material, on which four magnets 6 and 7, respectively, are arranged. The magnets form four sides of a square and are magnetized axially, as indicated by arrows 8 and 9, respectively. Balls 12 are located between planar faces 10 and 11 polarised with a North Pole N and a South Pole S, respectively. The collector halves 1 and 2 magnetically attract each other through the balls 12. In this way the balls 12 are magnetically retained in position and need not be enclosed in cages. The magnetic attractive force is of uniform strength so that the pressure on the balls 12 is uniform and there is no uneven load. Hence, there is none of the additional friction which is normally found when a spring is used. A signal current originating from the rotatable roll arrives at the disc electrode 5, then passes through the magnets 7, through the balls 12 from the rotatable collector half 2 to the stationary collector half, and through the magnets 6 to the disc electrode 4. The signal may be taken from a terminal 13 which is connected to the electrode 4 and to an electrical conductor which supplies the current to a measuring instrument, not shown.

Figure 3:
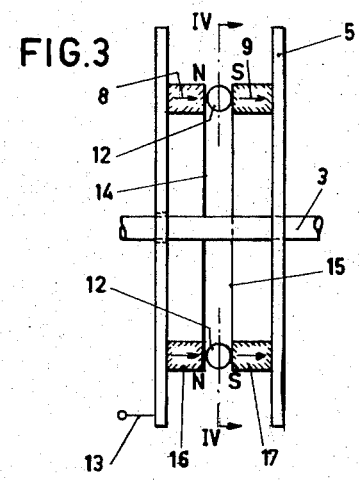
FIG. 3 shows an alternative emodiment to the collector shown in FIG. 1, provided with ring-shaped magnets.
Figure 4:
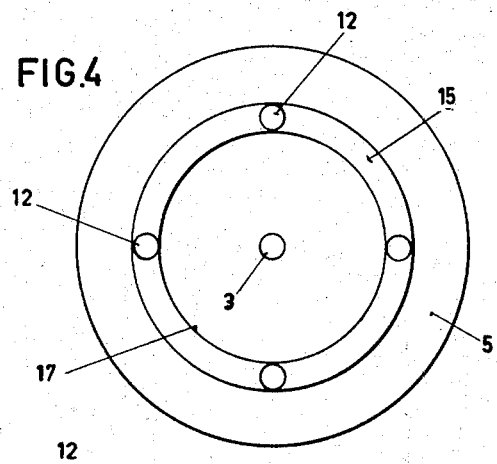
FIG. 4 is a cross-section on the line IV—IV of FIG. 3 and shows the rotatable collector half.

In FIGS. 3 and 4, the magnets 6 and 7 are replaced by ring magnets 16 and 17, respectively, which are axially magnetised as indicated by the arrows 8 and 9, respectively.

Figure 5:
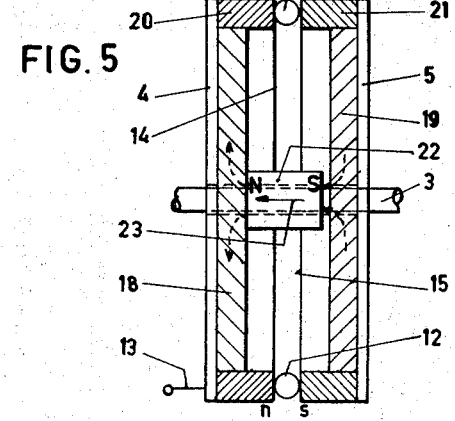
FIG. 5 shows an embodiment with a closed magnetic circuit, having a centrally disposed permanent magnet.

In the embodiment of FIG. 5, the halves of the magnetic circuit are each composed of a mild steel disc 18 or 19 and a mild steel ring 20 or 21, respectively. The complete circuit is activated by a centrally disposed permanent magnet 22, axially magnetised according to arrow 23.

In FIGS. 6 and 7 the stationary disc electrode 4 and the rotatable disc electrode 5 each carry two concentric ring magnets 24, 25 and 26, 27, respectively. The magnets are axially magnetised in a sense indicated by arrows 28, 29 and 30, 31 and are bridged by mild steel rings 32 and 33, respectively. Thus in each collector half an annular magnetic circuit is provided having a U-shaped cross-section in a plane perpendicular to the plane of FIG. 7. An outer race for balls 38 is formed between the polar faces 34, 36 of the magnet rings 24, 26 and an inner race for balls 39 is formed between the polar faces 35, 37 of the magnet rings 25, 27. Through these balls, the two magnetic circuits are closed, as is the electric circuit between the rotatable part and the stationary part.

FIGS. 8 and 9 show the same general construction of the magnetic circuit as FIGS. 6 and 7. However the races 34, 37 which in the embodiment of FIGS. 6 and 7 are entirely planar, are replaced by profiled races. The face 34 is replaced by a race 40 having a hollow circular groove to guide the balls. The faces 35 and 36 are replaced by races 41 each having a V-shaped groove. Finally, the face 37 is replaced by a race 42 having spherical recesses. All of said races are intended to suppress the greater mobility of the balls at higher speeds and to permit the passage of higher current densities through the balls since the single point contact has been replaced by a multipoint contact, or a greater contact area.

It will be appreciated that the various forms need not be applied all at the same time in one collector. FIG. 8 only illustrates types of profiles which can be utilised with higher speeds and higher current densities.

Figure 10:
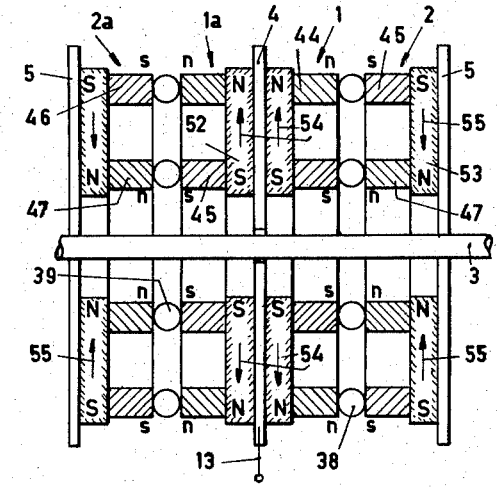
FIG. 10 shows another alternative to the collector of FIG. 6.

FIG. 10 shows a current collector of the type shown in FIG. 6. However, in FIG. 10, both pairs of concentric permanent magnetic rings 24, 25 and 26, 27, are replaced by mild steel rings 44, 45 and 46, 47, respectively, whereas the bridging rings 32 and 33 are replaced by permanent magnetic rings 52 and 53, respectively. The rings 52 and 53 are radially magnetised according to arrows 54 and 55, respectively.

This Figure further illustrates how the number of ball races can be increased. In this Figure the number of races is doubled compared to the collectors of FIGS. 6 and 8 by arranging, next to the collector unit 1, 2, a mirror image second collector unit 1a, 2a. In principle, any type of magnetic collector can be applied as an additional unit. Besides, it will easily be apparent that each magnetic collector unit can be extended axially by adding any number of magnetic collector units. The greater number of ball races thus obtained permits higher current densities to be transmitted and/or the number of balls per race to be reduced.

Figure 11:
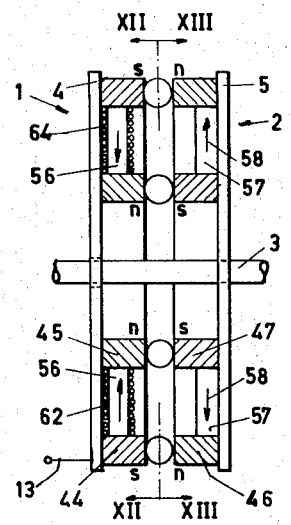
FIG. 11 shows another alternative to the embodiment of FIG. 6.
Figure 12:
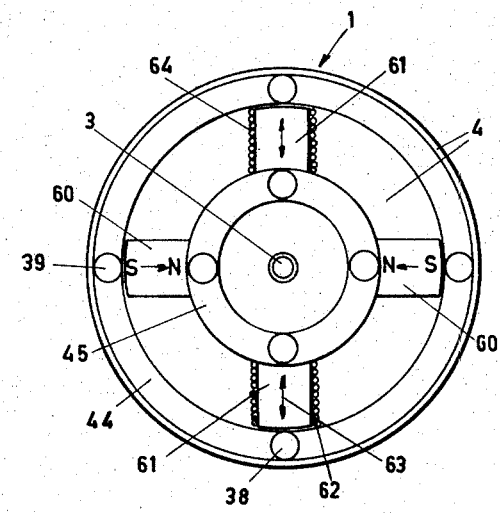
FIGS. 12 and 13 are cross-sections on the lines XII—XII and XIII—XIII of FIG. 11, and show the stationary collector half and the rotatable collector half, respectively.
Figure 13:
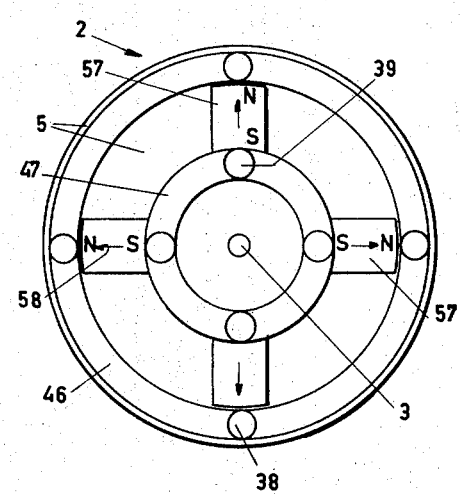

The current collector shown in FIGS. 11-13 is a modification of the type illustrated in FIG. 10 but, instead of the bridging rings 52 and 53, connecting straps 56 and 57 respectively are disposed in each of the collector halves between the rings 44, 45 and 46, 47 respectively, said straps being formed by four magnetic and-/or magnetisable bars angularly displaced by 90° from one another. FIG. 13 shows a view of the rotatable part in which the connecting straps comprise four permanent magnets 57. These magnets are radially magnetised as shown by arrow 58. Coils can be wound round the connecting straps, one strap to provide a field of an electro-magnet and another to be fed with a pulsating current influencing the signal. Both said currents can be supplied by one DC source, for instance a B- eliminator, viz, a power source eliminating an anode battery. The pulsating direct current flow is taken off immediately after a rectifying section and before a smoothing circuit associated with the source and the remainder is tapped after the smoothing circuits. This is made use of in the stationary collector half 1. Two of the four connecting straps are built as permanent magnets 60; the other two as a core 61 around which a coil is wound. The one coil 62 is fed with direct current of variable strength so that the magnitude of the magnetic flux created in the core is variable. Thus the total magnetic Flux of the magnetic circuit is adjustable, for instance amplifying when the magnetisation is directed radially inward, and attenuating after reversal of the current direction causing the magnetisation to be directed radially outward, as indicated by arrow 63. In this way the magnetic force on the balls can be readily adjusted.

The other coil 64 is fed with a pulsating direct current. The flux created is superimposed on the flux of the signal current. The signal current induced in the magnetic circuit by this alternating total flux can subsequently be amplified or attenuated with respect to the noise. This method is extremely effective since a signal that is very weak, during the cross-over from the rotatable part to the stationary part, passes through a highly concentrated magnetic field having the rotating balls at its centre and can be influenced thereby to an extremely high degree.

I claim:

1. A device for the transmission of electric current between relatively rotating parts, comprising a pair of electrically conducting members spaced from one another along an axis, said members presenting opposed surfaces perpendicular to said axis and spaced from one another therealong, one of said members being rotatable relative to the other about said axis, said surfaces providing a ball race in which are located a plurality of balls separating said members and providing an electrical connection therebetween, and magnetic means biassing said members towards one another to maintain electrical contact with said balls and transmitting flux through the balls to maintain the balls in the race.

2. A device according to claim 1, wherein one of the parts is stationary and the other part is rotatable about said axis.

3. A device according to claim 1, wherein each conducting member comprises an electrode and the magnetic means are carried partly by each electrode so that the balls are each located between opposite magnetic poles.

4. A device according to claim 3, wherein each electrode is disc-shaped.

5. A device according to claim 3, wherein the magnetic means comprises a pair of magnetic rings each carried by one of the electrodes.

6. A device according to claim 5, wherein coils are wound around at least some of the remaining connecting straps of one said part.

7. A device according to claim 3, wherein the magnetic means comprises a pair of ferro-magnetic rings each carried by an electrode, a pair of ferro-magnetic discs each connected to one of the rings, and a magnet connected to one of the electrodes and spaced from the other electrode by an air gap.

8. A device according to claim 7, wherein at least one pair of said rings is provided on each electrode, the rings of each pair being connected by connecting straps of ferro-magnetic material.

9. A device according to claim 8, wherein at least some of the straps are permanent magnets whose direction of magnetisation is each radially outwardly from said axis.

10. A device according to claim 9, wherein at least one of the coils is connected to a DC-source whose terminal voltage is adjustable to vary the flux of the electro-magnet so formed and in this way to vary indirectly the magnetic attractive force between the surfaces.

11. A device according to claim 9, wherein the DC-source is constructed to supply a pulsating direct current to the electro-magnet and to superimpose on said pulsating current a signal current to be transmitted by the collector.

12. A device according to claim 11, including means to vary the frequency of the pulsating current, thereby to vary the signal: noise ratio in the signal current.

13. A device according to claim 11, including means to vary the amplitude of the pulsating current, thereby to vary the signal: noise ratio in the signal current.

* * * * *